United States Patent
Rao

(10) Patent No.: US 10,592,307 B2
(45) Date of Patent: Mar. 17, 2020

(54) MULTI USER THREADED EXECUTOR

(71) Applicant: salesforce.com, inc., San Francisco, CA (US)

(72) Inventor: Leela Maheshwara Rao, Hyderabad (IN)

(73) Assignee: salesforce.com, inc., San Francisco, CA (US)

( * ) Notice: Subject to any disclaimer, the term of this patent is extended or adjusted under 35 U.S.C. 154(b) by 62 days.

(21) Appl. No.: 15/376,814

(22) Filed: Dec. 13, 2016

(65) Prior Publication Data

US 2018/0165138 A1    Jun. 14, 2018

(51) Int. Cl.
G06F 9/46    (2006.01)
G06F 9/54    (2006.01)

(52) U.S. Cl.
CPC ...... *G06F 9/542* (2013.01); *G06F 2212/2542* (2013.01)

(58) Field of Classification Search
CPC .................................................. G06F 9/4881
USPC ......................................................... 718/103
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |

(Continued)

OTHER PUBLICATIONS

U.S. Appl. No. 13/986,251, Apr. 16, 2013.

*Primary Examiner* — Mehran Kamran
(74) *Attorney, Agent, or Firm* — Dergosits & Noah LLP; Todd A. Noah

(57) ABSTRACT

Exclusive threads for multiple queues is described. A computing system adds a first event associated with a first entity to a first queue in response to receiving the first event. The computing system adds a second event associated with a second entity to a second queue in response to receiving the second event. The computing system adds a third event associated with the second entity to the second queue in response to receiving the third event. A first thread in the computing system removes the first event from the first queue, wherein any event in the first queue is removed exclusively by the first thread. The first thread processes the first event.

20 Claims, 5 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,509,671 B1* | 3/2009 | Bedell ................ G06F 9/5038 726/6 |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,522,192 B1* | 8/2013 | Avalos ................ G06F 9/45512 717/100 |
| 8,566,301 B2 | 10/2013 | Rueben et al. |
| 8,646,103 B2 | 2/2014 | Jakobson et al. |
| 9,264,440 B1* | 2/2016 | Stern ................ H04L 61/1511 |
| 2001/0044791 A1 | 11/2001 | Richter et al. |
| 2002/0046043 A1* | 4/2002 | Smith, Jr. ................ G06Q 40/00 705/35 |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1* | 1/2003 | Chen ................ G06Q 10/06 719/328 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0148283 A1* | 7/2004 | Harris ................ G06F 9/466 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0050490 A1* | 3/2007 | Larkin ................ G06F 9/4862 709/223 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2012/0284725 A1* | 11/2012 | Zwaal ................ G06F 9/5027 718/102 |
| 2013/0042001 A1* | 2/2013 | Gould ................ G06F 9/542 709/224 |
| 2013/0145374 A1* | 6/2013 | Sweeney ................ G06F 9/52 718/104 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0332867 A1* | 12/2013 | Dunn ................ G06F 3/038 715/764 |
| 2014/0047140 A1* | 2/2014 | Otenko ................ G06F 9/5027 710/54 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0178125 A1* | 6/2015 | van der Lugt ........ G06F 9/4881 718/102 |
| 2015/0212794 A1* | 7/2015 | Otenko ................ G06F 9/52 710/109 |
| 2017/0346923 A1* | 11/2017 | Gong ................ B67D 1/0888 |

* cited by examiner

MULTI USER THREADED EXECUTOR

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In computer science, a queue is a particular kind of collection in which the elements in the collection are kept in order, and the principal (or only) operations on the collection are the addition of elements to the rear terminal position, known as enqueue, and removal of elements from the front terminal position, known as dequeue. Such operations make the queue a First-In-First-Out (FIFO) data structure, in which the first element added to the queue will be the first element to be removed, which is equivalent to the requirement that once a new element is added, all elements that were previously added have to be removed before the new element can be removed.

Queues perform the function of a buffer when various elements such as data, objects, or events are stored and held to be processed later. For an example, users may request to purchase products through an e-commerce website, and the website administrator may create a data structure similar to the one below to maintain a product list against each user on the web server side. Although this example data structure is based on the Java programming language and may be accessed by a Java thread pool executor, other data structures that are accessed by other executors are similar.

```
public class UserProductList {
    private String userId;
    :
    :
    :
    private ConcurrentHashMap<ProductId, ProductOrderDetails> productMap;
}
```

If a user sequentially requests to purchase 2 products, the web server can add these 2 user requests to a queue, such that 2 concurrently executing threads can remove these user requests from the queue and concurrently process these 2 user requests. Although receiving simultaneous user requests from the same user is rare, the website administrator still needs to use server-side data structures that are safe for concurrent threads just in case two concurrent threads finish processing 2 user requests from the same user at approximately the same time. Since these parallel threads need to update the same UserProductList object, the website administrator defines the map as a concurrent hash map, which ensures that this data structure inside the UserProductList object is safe for concurrent threads.

FIG. 1 depicts the functioning of a system 100 that includes a multi-thread queue. A web server 102 receives all user requests from the users 110-118, and adds these user requests to a multi-thread queue 130, so that concurrently executing threads 140-146 can remove the user requests from the multi-thread queue 130 and concurrently process these user requests. Although FIG. 1 depicts the system 100 as including 5 users 110-118, 1 queue 130, and 4 threads 140-146, the system 100 can include any number of users 110-118, only 1 queue 130, and at least 2 threads 140-146.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
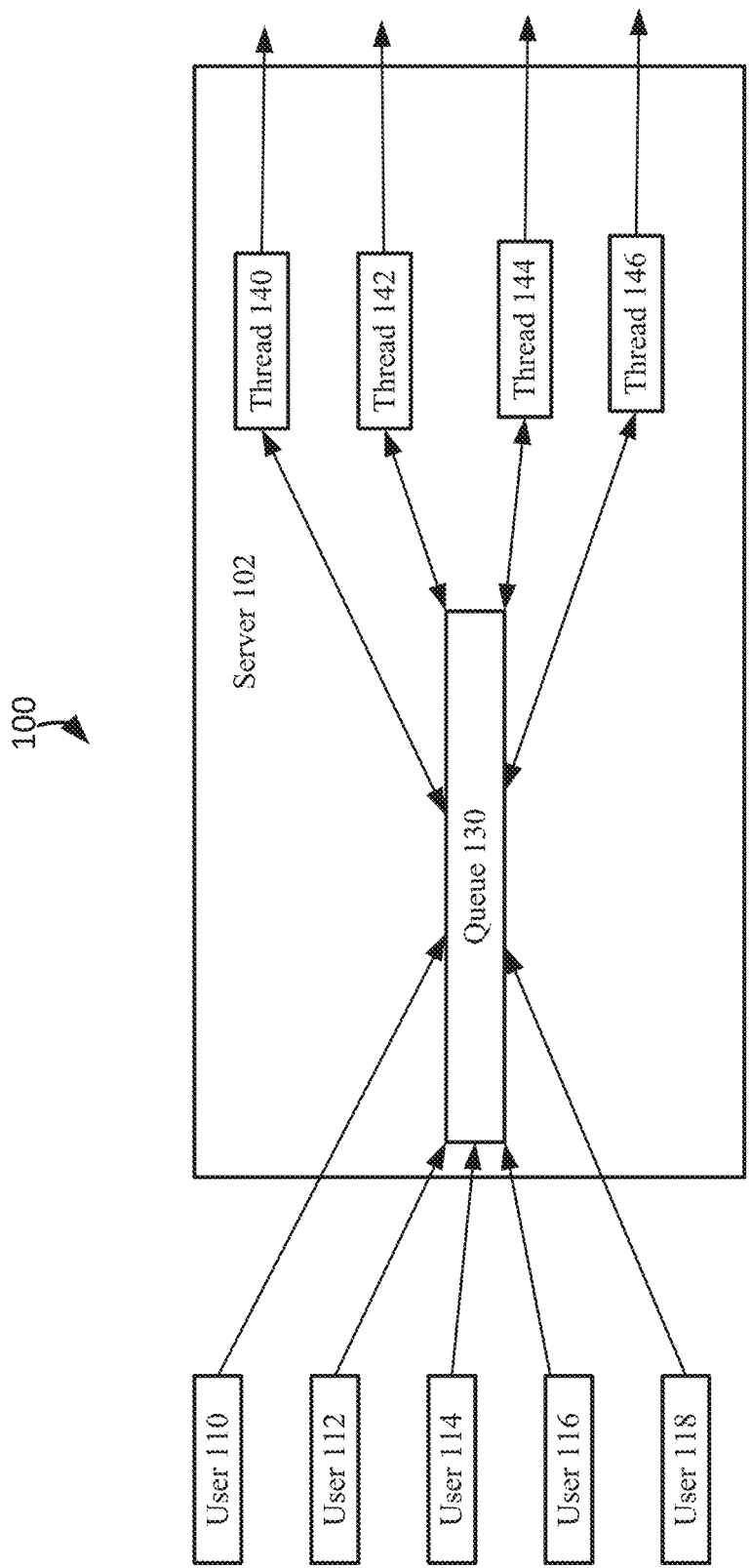
FIG. 1 depicts an example prior art system.

Computer operating systems require greater overhead and function at slower processing speeds when coordinating with synchronized data structures. Therefore, accessing synchronized data structures that are configured to be safe for concurrent threads requires more system resources than accessing non-synchronized data structures that are not configured to be safe for concurrent threads.

Methods and mechanisms for exclusive threads for multiple queues will be described with reference to example embodiments. The following detailed description will first describe a method for exclusive threads for multiple queues. Next, example systems for exclusive threads for multiple queues are described.

In accordance with embodiments described herein, there are provided systems and methods for exclusive threads for multiple queues. A first event associated with a first entity is added to a first queue in response to receiving the first event. A second event associated with a second entity is added to a second queue in response to receiving the second event. A third event associated with the second entity is added to the second queue in response to receiving the third event. A first thread removes the first event from the first queue, wherein any event in the first queue is removed exclusively by the first thread. The first thread processes the first event.

For example, a user named Ann requests to purchase a book through an ecommerce website, so a computing system adds Ann's book request to a first queue. Next, a user named Bob requests to purchase music through the ecommerce website, so the computing system adds Bob's music request to a second queue. Then Bob requests to purchase a book via the ecommerce website, so the computing system adds Bob's book request to the second queue. The computing system adds Bob's book request to the second queue because the second queue stores all of Bob's requests, instead of alternating queues by adding Bob's request to the first queue or adding all book requests to the first queue. Since any request in the first queue is removed only by the first thread in the computing system, the first thread removes Ann's book request from the first queue. The first thread processes Ann's book request. Since user requests from the same user are always processed by the same thread, concurrent threads will not access the same data structure for user data, such that a website administrator can conserve system resources by using non-synchronized data structures that are not configured to be safe for concurrent threads.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 2:
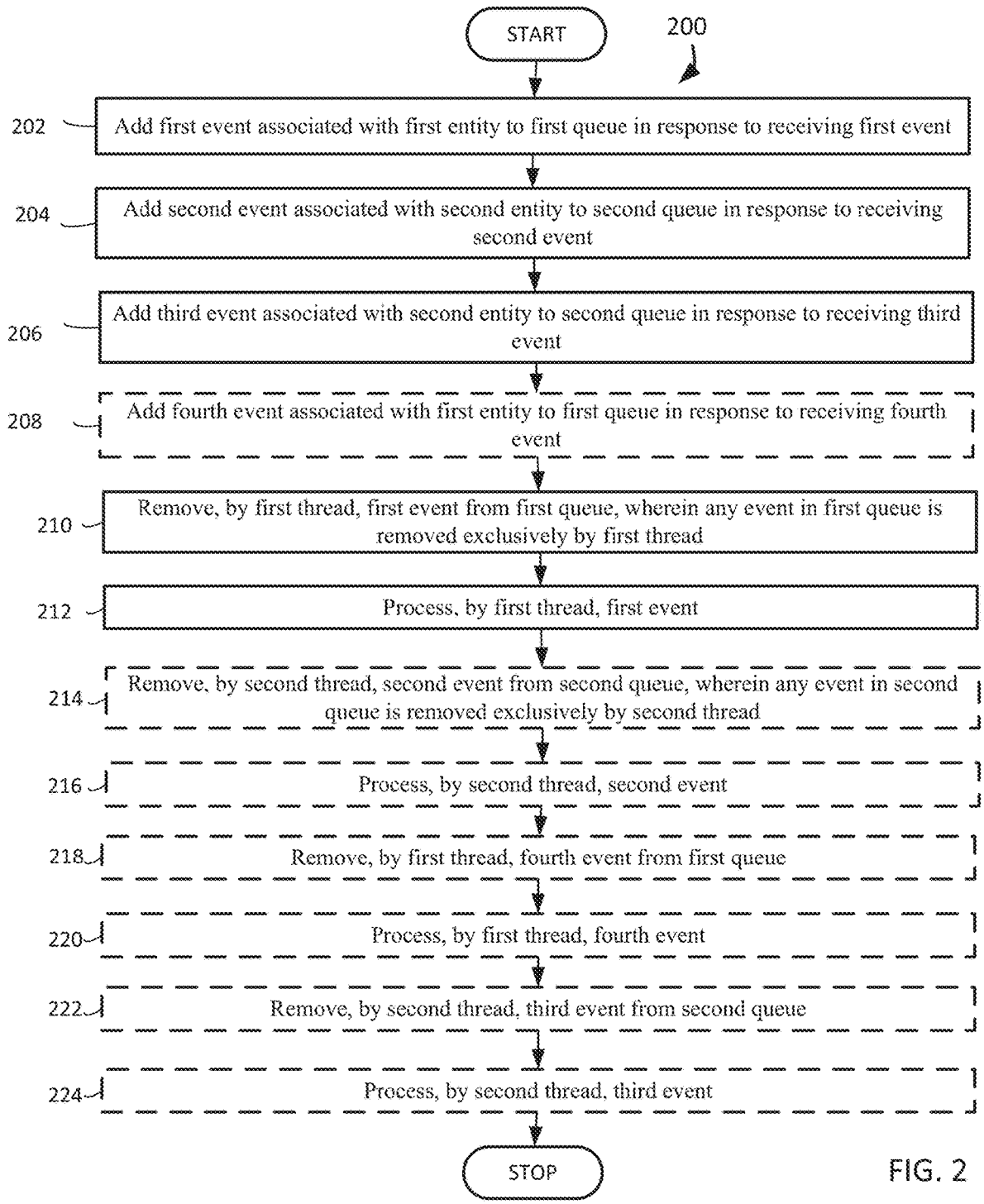
FIG. 2 is an operational flow diagram illustrating a high level overview of a method for multi user threaded executor, in an embodiment.
Figure 3:
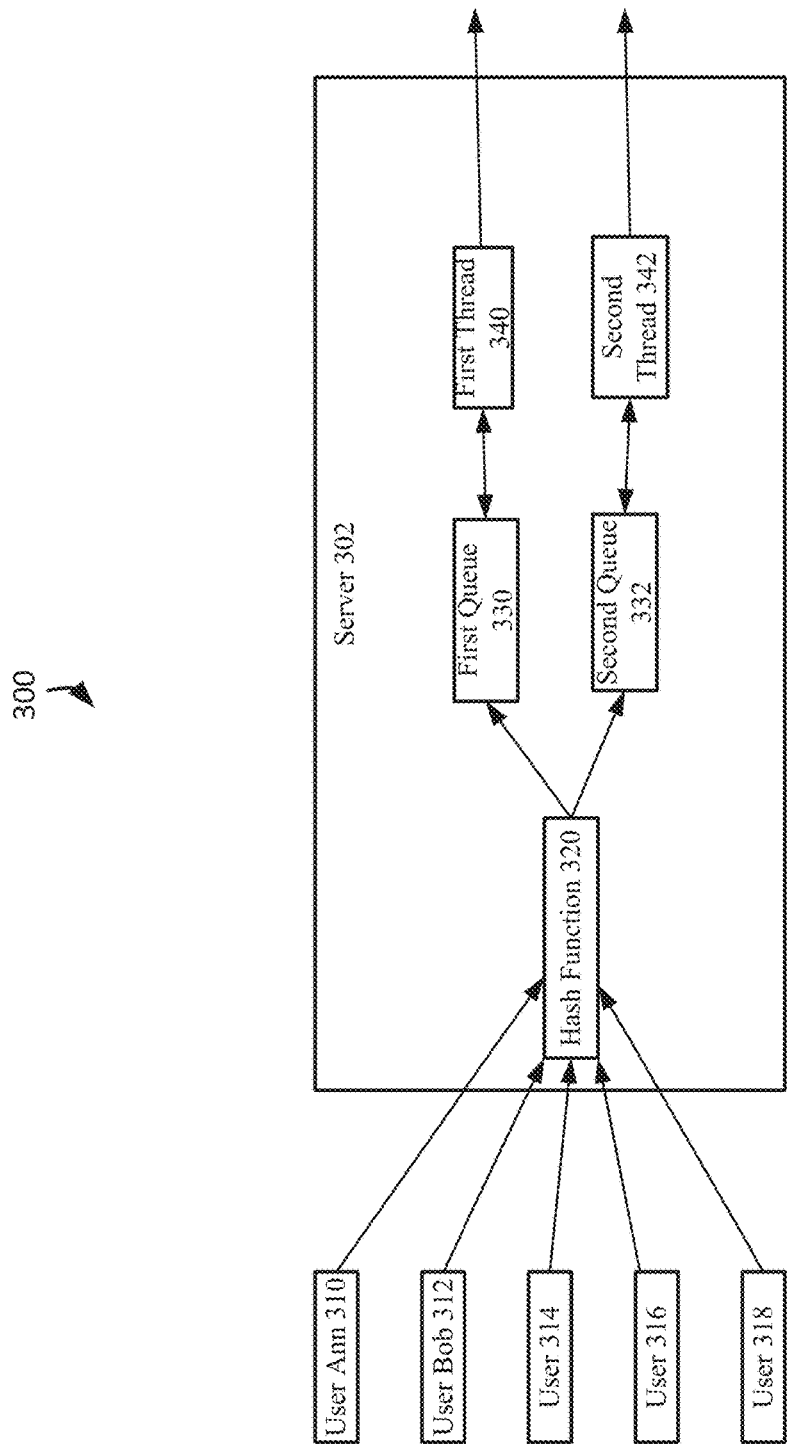
FIG. 3 depicts an example system for multi user threaded executor, in an embodiment.

FIG. 2 is an operational flow diagram illustrating a high level overview of a method 200 for exclusive threads for multiple queues. The example of a system 300 and its components which are mentioned below in reference to FIG. 2 are depicted in FIG. 3 and described below in reference to FIG. 3.

A first event associated with a first entity is added to a first queue in response to receiving the first event, block 202. The computing system selects the first queue for adding the first received event, and the selection of the first queue may be based on applying a hash function to the unique identifier of the entity for the first event. For example and without limitation, this can include the computing system generating a hash value by applying a hash function 320 to the unique user identifier for a user Ann 310, using the generated hash value to map Ann's book request to a first queue 330, and adding Ann's book request to the first queue 330, in response to the user Ann 310 requesting to purchase a book through an ecommerce website, as depicted in FIG. 3. An event can be a thing that is detected by a computing system, such as a user request. An entity can be a thing with distinct and independent existence, such as a person or a product. A hash function can be any type of relationship that is used to map data of arbitrary size to data of fixed size. A unique identifier can be a sequence of characters used to identify or refer to an entity as being the only one of its kind. Although this example describes the entity as a user and the unique identifier as a user identifier in a user request system, the entity may be a product and the unique identifier may be a product identifier in a product inventory system.

After adding the first event to the first queue, a second event associated with a second entity is added to a second queue in response to receiving the second event, block 204. The computing system selects the second queue for adding the second received event, and the selection of the second queue may be based on applying the hash function to the unique identifier of the entity for the second event. By way of example and without limitation, this can include the computing system generating a hash value by applying the hash function 320 to the unique user identifier for a user Bob 312, using the generated hash value to map Bob's music request to a second queue 332, and adding Bob's music request to the second queue 332, in response to the user Bob 312 requesting to purchase music through the ecommerce website, as depicted in FIG. 3.

Following the addition of the second event to the second queue, a third event associated with the second entity is added to the second queue in response to receiving the third event, block 206. The computing system selects the second queue for adding the third received event, and the selection of the second queue may be based on applying the hash function to the unique identifier of the entity for the third event. In embodiments, this can include the computing system generating a hash value by applying the hash function 320 to the unique user identifier for the user Bob 312, using the generated hash value to map Bob's book request to the second queue 332, and adding Bob's book request to the second queue 332, in response to the user Bob 312 requesting to purchase a book through the ecommerce website, as depicted in FIG. 3. The computing system adds Bob's book request to the second queue 332 because the second queue 332 stores all of Bob's requests, instead of alternating queues by adding Bob's request to the first queue 330 or adding all book requests to the first queue 330.

Once the third event is added to the second queue, a fourth event associated with the first entity is optionally added to the first queue in response to receiving the fourth event, block 208. The computing system selects the first queue for adding the fourth received event, and the queue selection may be based on applying the hash function to the unique identifier of the entity for the fourth event. For example and without limitation, this can include the computing system generating a hash value by applying the hash function 320 to the unique user identifier for the user Ann 310, using the generated hash value to map Ann's music request to the first queue 330, as depicted in FIG. 3. This will also include the computing system adding Ann's music request to the first queue 330 in response to the user Ann 310 requesting to purchase music through the ecommerce website, also as depicted in FIG. 3. The computing system adds Ann's music request to the first queue 330 because the first queue 330 stores all of Ann's requests, instead of adding all music requests to the second queue 332.

When events have been added to queues, a first thread removes the first event from the first queue, wherein any event in the first queue is removed exclusively by the first thread, block 210. Since any event in the first queue can be removed and then processed only by the first thread, the computing system does not need to maintain a synchronized data structure to store any processed event that was removed from the first queue. By way of example and without limitation, this can include the computing system's first thread 340 removing Ann's book request from the first queue 330 because any request in the first queue 330 can only be removed by the first thread 340, as depicted in FIG.

3. A thread can be the smallest sequence of programmed instructions that can be managed independently by a computer's scheduler, which is typically a part of the computer's operating system. Any event in a queue being removed exclusively by a thread can be the thread having the exclusive capability and/or rights to remove any event from the queue.

After the first event is removed from the first queue, the first thread processes the first event, block 212. Since the first event is processed by the only thread that can remove the first event from the first queue, the computing system does not need to maintain a synchronized data structure to store the processed first event. In embodiments, this can include the computing system's first thread 340 processing Ann's book request that was removed from the first queue 330, as depicted in FIG. 3. Since user requests from the same user are always processed by the same thread, concurrent threads will not access the same data structure that stores the same user's processed requests, such that a website administrator can conserve system resources by using non-synchronized data structures that are not configured to be safe for concurrent threads. For example, the website administrator can define the UserProductList object's map as a hash map that is not safe for concurrent threads, instead of as a concurrent hash map that is safe for concurrent threads. In another example, the website administrator can create a counter as a simple long variable to count the number of user requests from a user, instead of creating the counter as an AtomicLong variable to enable updating by concurrent threads. Since an event can be removed from a queue by only one thread, the system 300 avoids the contention problems that occur when multiple threads 140-146 concurrently attempt to remove an element from the single queue 130 depicted in FIG. 1. Furthermore, a website administrator can configure to pin threads to execute on certain cores in a Non-Uniform Memory Accessing (NUMA) aware system. Since the same thread processes all of a user's requests, the thread can store all of the user's processed requests in the same local core memory where the thread executes, thereby avoiding the costly operation of accessing memory from different cores in other sockets. Processing can be operating on computer data by means of a computer program.

Following the processing of the first event from the first queue, a second thread optionally removes the second event from the second queue, wherein any event in the second queue is removed exclusively by the second thread, block 214. Since any event in the second queue can be removed and then processed only by the second thread, the computing system does not need to maintain a synchronized data structure to store any processed event that was removed from the second queue. For example and without limitation, this can include the computing system's second thread 342 removing Bob's music request from the second queue 332 because any request in the second queue 332 can only be removed by the second thread 342, as depicted in FIG. 3.

Once the second event is removed from the second queue, the second thread optionally processes the second event, block 216. Since the second event is processed by the only thread that can remove the second event from the second queue, the computing system does not need to maintain a synchronized data structure to store the processed second event. By way of example and without limitation, this can include the computing system's second thread 342 processing Bob's music request that was removed from the second queue 332, as depicted in FIG. 3.

When the second event from the second queue has been processed, the first thread optionally removes the fourth event from the first queue, block 218. Since any event in the first queue can be removed and then processed only by the first thread, the computing system does not need to maintain a synchronized data structure to store any processed event that was removed from the first queue. In embodiments, this can include the computing system's first thread 340 removing Ann's music request from the first queue 330 because any request in the first queue 330 can only be removed by the first thread 340, as depicted in FIG. 3.

After the fourth event is removed from the first queue, the first thread optionally processes the fourth event, block 220. Since the fourth event is processed by the only thread that can remove the fourth event from the first queue, the computing system does not need to maintain a synchronized data structure to store the processed fourth event. For example and without limitation, this can include the computing system's first thread 340 processing Ann's music request that was removed from the first queue 330, as depicted in FIG. 3.

Following the processing of the fourth event from the first queue, the second thread optionally removes the third event from the second queue, block 222. Since any event in the second queue can be removed and then processed only by the second thread, the computing system does not need to maintain a synchronized data structure to store any processed event that was removed from the second queue. By way of example and without limitation, this can include the computing system's second thread 342 removing Bob's book request from the second queue 332 because any request in the second queue 332 can only be removed by the second thread 342, as depicted in FIG. 3.

Once the third event is removed from the second queue, the second thread optionally processes the third event, block 224. Since the third event is processed by the only thread that can remove the third event from the second queue, the computing system does not need to maintain a synchronized data structure to store the processed third event. In embodiments, this can include the computing system's second thread 342 processing Bob's book request that was removed from the second queue 332, as depicted in FIG. 3.

The method 200 may be repeated as desired. Although this disclosure describes the blocks 202-224 executing in a particular order, the blocks 202-224 may be executed in a different order. In other implementations, each of the blocks 202-224 may also be executed in combination with other blocks and/or some blocks may be divided into a different set of blocks.

FIG. 3 depicts an example system 300 for exclusive threads for multiple queues, in an embodiment. Although FIG. 3 depicts the system 300 as including 5 users 310-318, 1 hash function 320, 2 queues 330-332, and 2 threads 340-342, the system 300 can include any number of users 310-318, only 1 hash function 320, at least 2 queues 330-332, and at least 2 threads 340-342. In response to one of the users 310-318 requesting to purchase a product through an ecommerce website, the computing system generates a hash value by applying a hash function 320 to the unique user identifier for the requesting user, uses the generated hash value to map the user's request to a specific one of the queues 330-332, and adds the user's request to the specific queue. Next, the user request is removed from the specific queue by the only one of the threads 340-342 that can remove the user request from the specific queue. Then the user request is processed by the only thread that can remove the user request from the specific queue.

Figure 4:
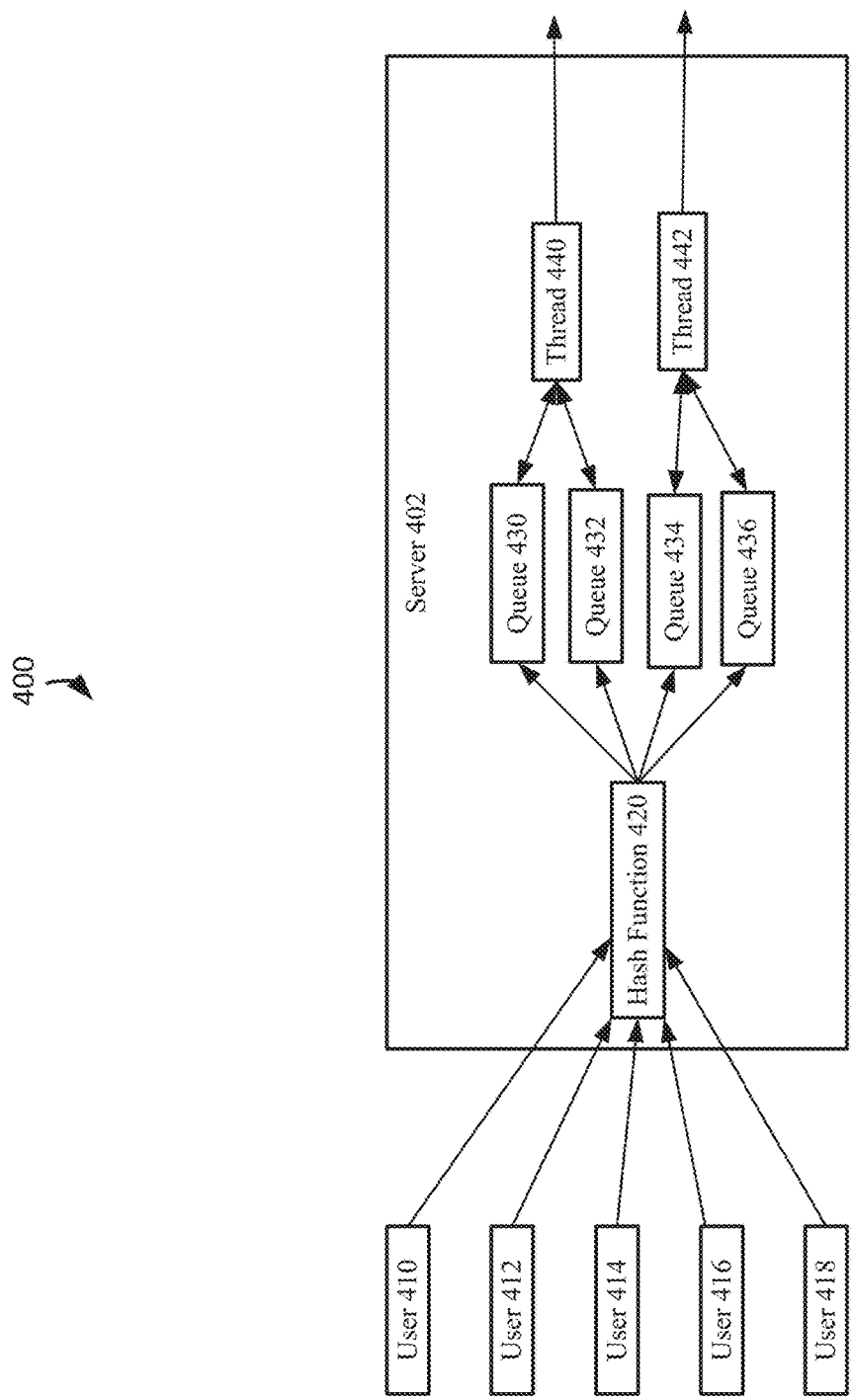
FIG. 4 depicts another example system for multi user threaded executor, in an embodiment.

FIG. 4 depicts another example system 400 for exclusive threads for multiple queues, in an embodiment. Although FIG. 4 depicts the system 400 as including 5 users 410-418, 1 hash function 420, 4 queues 430-436, and 2 threads 440-442, the system 400 can include any number of users 410-418, only 1 hash function 420, at least 3 queues 430-436, and at least 2 threads 440-442. In response to one of the users 410-418 requesting to purchase a product through an ecommerce website, the computing system generates a hash value by applying a hash function 420 to the unique user identifier for the requesting user, uses the generated hash value to map the user's request to a specific one of the queues 430-436, and adds the user's request to the specific queue. Next the user request is removed from the specific queue by the only one of the threads 440-442 that can remove the user request from the specific queue. Then the user request is processed by the only thread that can remove the user request from the specific queue.

While the system 400 has many similarities to the system 300 that is depicted in FIG. 3, the system 400 has significant differences from the system 300. Whereas the system 300 has a one-to-one ratio of 2 queues 330-332 to 2 threads 340-342, the system 400 has more queues 430-436 than threads 440-442. Since the thread 440 is the only thread that can remove user requests from the queue 430 and is the only thread that can remove user requests from the queue 432, after the thread 440 removes a user request from the queue 430, the thread 440 removes a user request from the queue 432. Similarly, since the thread 442 is the only thread that can remove user requests from the queue 434 and is the only thread that can remove user requests from the queue 436, after the thread 440 removes a user request from the queue 434, the thread 440 removes a user request from the queue 436. The thread 440 may remove all user requests from the queue 430 before removing a user request from the queue 432. Similarly, the thread 442 may remove all user requests from the queue 434 before removing a user request from the queue 436.

Although FIG. 4 depicts the system 400 as having a two-to-one ratio of 4 queues 430-436 to 2 threads 440-442, the system 400 can have any ratio of queues 430-436 to threads 440-442, provided that the number of queues 430-436 is more than the number of threads 440-442, and any user request in a queue can only be removed by one thread. Having more queues 430-436 than threads 440-442 may enable the system to function more efficiently because when a thread removes all of the user requests from an initial queue, the thread can remove user requests from another queue rather than have to wait for more user requests to be added to the initial queue.

System Overview

Figure 5:
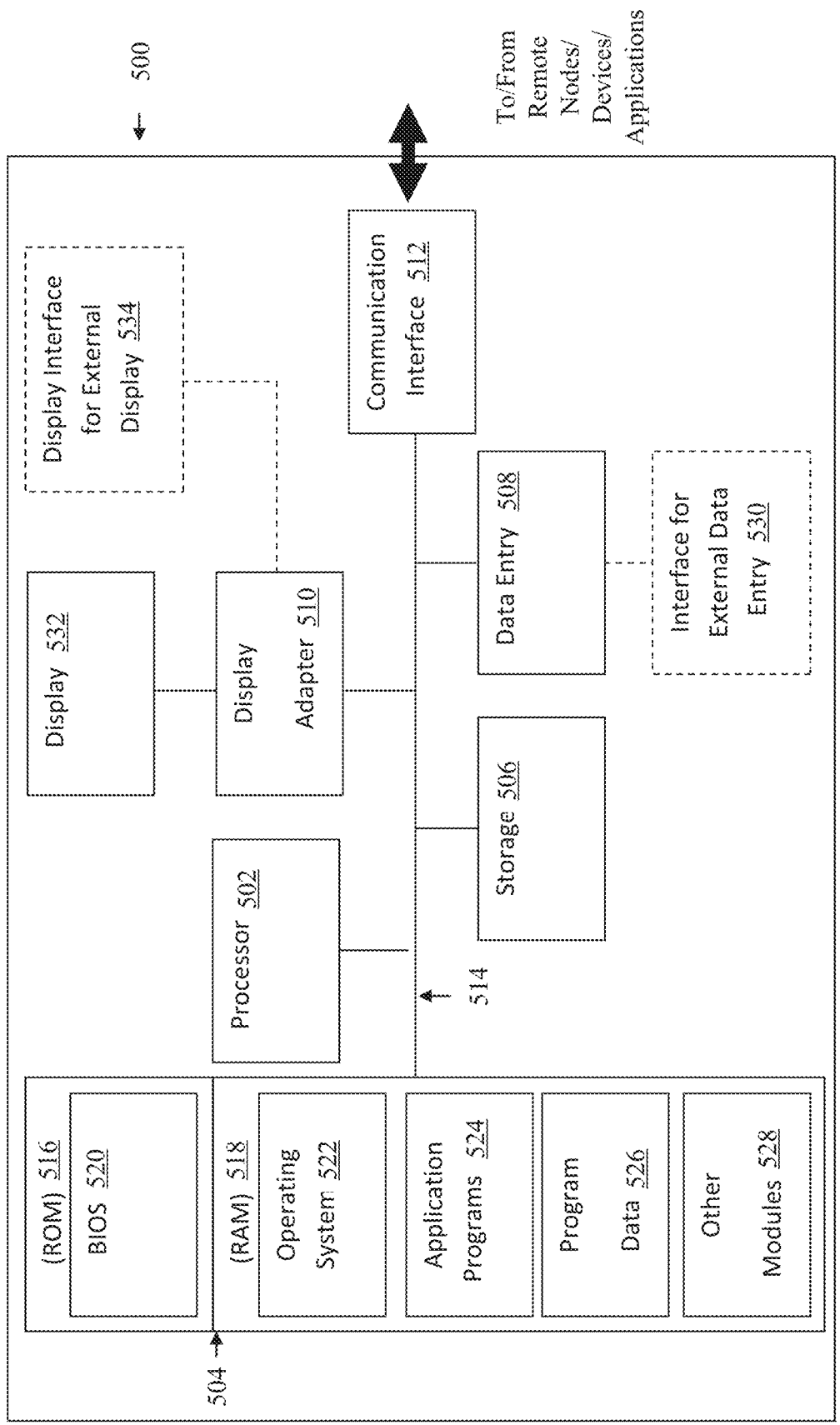
FIG. 5 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for exclusive threads for multiple queues, the system comprising:
   one or more processors; and
   a non-transitory computer readable medium storing a plurality of instructions, which when executed, cause the one or more processors to:
   add, by a computing system, a first event associated with a first entity to a first queue in response to receiving the first event;
   add, by the computing system, a second event associated with a second entity to a second queue in response to receiving the second event;

add, by the computing system, a third event associated with the second entity to the second queue in response to receiving the third event;

remove, by a first thread in the computing system, the first event from the first queue, the first thread being associated with the first queue and a third queue and having the exclusive right to remove any event only from the first queue or the third queue;

process, by the first thread in the computing system, the first event; and process, by the first thread in the computing system, an event in the third queue when all events in the first queue have been processed by the first thread.

2. The system of claim 1, comprising further instructions, which when executed, cause the one or more processors to add, by the computing system, a fourth event associated with the first entity to the first queue in response to receiving the fourth event.

3. The system of claim 2, comprising further instructions, which when executed, cause the one or more processors to:
remove, by the first thread in the computing system, the fourth event from the first queue; and
process, by the first thread in the computing system, the fourth event.

4. The system of claim 1, comprising further instructions, which when executed, cause the one or more processors to:
remove, by a second thread in the computing system, the second event from the second queue, wherein any event in the second queue is removed exclusively by the second thread; and
process, by the second thread in the computing system, the second event.

5. The system of claim 4, comprising further instructions, which when executed, cause the one or more processors to:
remove, by the second thread in the computing system, the third event from the second queue; and
process, by the second thread in the computing system, the third event.

6. The system of claim 1, wherein adding the first event associated with the first entity to the first queue is based on applying a hash function to a unique identifier associated with the first entity.

7. The system of claim 1, wherein adding the second event associated with the second entity to the second queue is based on applying a hash function to a unique identifier associated with the second entity.

8. A computer program product comprising computer-readable program code to be executed by one or more processors when retrieved from a non-transitory computer-readable medium, the program code including instructions to:
add, by a computing system, a first event associated with a first entity to a first queue in response to receiving the first event;
add, by the computing system, a second event associated with a second entity to a second queue in response to receiving the second event;
add, by the computing system, a third event associated with the second entity to the second queue in response to receiving the third event;
remove, by a first thread in the computing system, the first event from the first queue, the first thread being associated with the first queue and a third queue and having the exclusive right to remove any event only from the first queue or the third queue;
process, by the first thread in the computing system, the first event; and
process, by the first thread in the computing system, an event in the third queue when all events in the first queue have been processed by the first thread.

9. The computer program product of claim 8, wherein the program code comprises further instructions to add, by the computing system, a fourth event associated with the first entity to the first queue in response to receiving the fourth event.

10. The computer program product of claim 9, wherein the program code comprises further instructions to:
remove, by the first thread in the computing system, the fourth event from the first queue; and
process, by the first thread in the computing system, the fourth event.

11. The computer program product of claim 8, wherein the program code comprises further instructions to:
remove, by a second thread in the computing system, the second event from the second queue, wherein any event in the second queue is removed exclusively by the second thread; and
process, by the second thread in the computing system, the second event.

12. The computer program product of claim 11, wherein the program code comprises further instructions to:
remove, by the second thread in the computing system, the third event from the second queue; and
process, by the second thread in the computing system, the third event.

13. The computer program product of claim 8, wherein adding the first event associated with the first entity to the first queue is based on applying a hash function to a unique identifier associated with the first entity.

14. The computer program product of claim 8, wherein adding the second event associated with the second entity to the second queue is based on applying a hash function to a unique identifier associated with the second entity.

15. A method comprising:
adding, by a computing system, a first event associated with a first entity to a first queue in response to receiving the first event;
adding, by the computing system, a second event associated with a second entity to a second queue in response to receiving the second event;
adding, by the computing system, a third event associated with the second entity to the second queue in response to receiving the third event;
removing, by a first thread in the computing system, the first event from the first queue, the first thread being associated with the first queue and a third queue and having the exclusive right to remove any event only from the first queue or the third queue;
processing, by the first thread in the computing system, the first event; and
processing, by the first thread in the computing system, an event in the third queue when all events in the first queue have been processed by the first thread.

16. The method of claim 15, wherein the method further comprises:
adding, by the computing system, a fourth event associated with the first entity to the first queue in response to receiving the fourth event;
removing, by the first thread in the computing system, the fourth event from the first queue; and
processing, by the first thread in the computing system, the fourth event.

17. The method of claim 15, wherein the method further comprises:

removing, by a second thread in the computing system, the second event from the second queue, wherein any event in the second queue is removed exclusively by the second thread; and processing, by the second thread in the computing system, the second event.

18. The method of claim 17, wherein the method further comprises:

removing, by the second thread in the computing system, the third event from the second queue; and processing, by the second thread in the computing system, the third event.

19. The method of claim 15, wherein adding the first event associated with the first entity to the first queue is based on applying a hash function to a unique identifier associated with the first entity.

20. The method of claim 15, wherein adding the second event associated with the second entity to the second queue is based on applying a hash function to a unique identifier associated with the second entity.

* * * * *